United States Patent [19]

Loop

[11] Patent Number: 5,694,152
[45] Date of Patent: Dec. 2, 1997

[54] SYSTEM FOR STEERING AN ELECTRONICALLY RESPONSIVE DEVICE

[75] Inventor: James P. Loop, Sacramento, Calif.

[73] Assignee: Hunter Digital, Ltd., Los Angeles, Calif.

[21] Appl. No.: 522,840

[22] Filed: Sep. 1, 1995

[51] Int. Cl.$^6$ .................. G09G 5/08; G06F 3/033
[52] U.S. Cl. .......................... 345/157; 345/159
[58] Field of Search ............... 345/156, 157, 345/160, 161, 159; 463/36–38; 338/153; 200/86.5, DIG. 23, 339; 340/384.5, 407.2; 341/27

[56] References Cited

U.S. PATENT DOCUMENTS

| | | |
|---|---|---|
| 3,995,126 | 11/1976 | Larson . |
| 4,386,346 | 5/1983 | Levine . |
| 4,524,348 | 6/1985 | Lefkowitz . |
| 4,670,738 | 6/1987 | Weinblatt . |
| 4,687,200 | 8/1987 | Shirai ............................ 463/37 |
| 4,746,913 | 5/1988 | Volta . |
| 4,754,268 | 6/1988 | Mori . |
| 4,816,810 | 3/1989 | Moore . |
| 4,817,950 | 4/1989 | Goo ............................ 463/36 |
| 4,931,781 | 6/1990 | Miyakawa ...................... 345/160 |
| 5,230,623 | 7/1993 | Guthrie et al. . |
| 5,245,320 | 9/1993 | Boulton . |
| 5,260,696 | 11/1993 | Maynard, Jr. . |
| 5,313,230 | 5/1994 | Venolia et al. . |
| 5,317,336 | 5/1994 | Hall . |
| 5,334,997 | 8/1994 | Scallon . |
| 5,426,275 | 6/1995 | Maeda et al. . |
| 5,504,502 | 4/1996 | Arita et al. ...................... 345/160 |
| 5,510,812 | 4/1996 | O'Mara et al. ................... 345/161 |

FOREIGN PATENT DOCUMENTS

4035273A1  5/1992  Germany .

*Primary Examiner*—Jeffery Brier
*Attorney, Agent, or Firm*—Merchant, Gould, Smith, Edell, Welter & Schmidt

[57] ABSTRACT

A steering and pointing device for use with a computer comprises an electronic circuit mounted on a board. A first control element is responsive to foot pressure applied by rotating the foot about the ankle. The pressure applied to the first control element causes a transducer responsive element to operate the circuit. The first control element is movable with respect to the transducer such that foot action acts to cause the first control element to swivel a partial ball and socket interengagement and thereby interact with the circuit. A first control element includes a resilient material mounted such that pressure applied to the resilient material causes movement in different directions of the transducer. This acts to change the electrical relationship on the board and thereby vary an output signal from the electronic circuit. There is an output signal transmitted to operating a device on a computer. A second control element is located substantially adjacent to a first control element, and operates a switch for the circuit. In other cases, the first control element is movable by moving a hand on the first control element.

34 Claims, 8 Drawing Sheets

SYSTEM FOR STEERING AN ELECTRONICALLY RESPONSIVE DEVICE

BACKGROUND

Having an ergonomically effective mouse for operating a computer is highly desirable.

This invention relates to a trigger operated electronic device. In particular, it concerns a mouse for operating a cursor in a computer system.

A conventional mouse for operating a computer system is one which is hard wired to the computer and which physically moves over a base. The mouse movement is effected by having a hand grasp the top of the unit and moving the mouse on the base. Below the top of the unit there is a ball mounted in a track and as the ball rotates, the mouse moves on the base. There are usually at least two switches on the top face of the mouse. Pressing one or more switches in an appropriate sequence and for appropriate times causes an electrical signal to be transmitted from the mouse to the computer which is then operated. Conventionally, the shape of the mouse is one which fits under the palm of the hand when the palm of the hand is turned to face downwardly.

This mouse is a relatively clumsy system for computer operation. What is particularly unwieldy is the fact that the hand of an operator needs to be moved to the location of the mouse on a mouse pad or base, or to a pointing stick in the middle of a keyboard. This is particularly inconvenient as the operator's hands also need to be available for use to operate a computer keyboard or be for use for other purposes unassociated with the computer. This difficulty is further compounded by the fact that the mouse pad is usually located in a removed position relative to the other computer components. One therefore finds that operating a computer with a mouse in this hard wired fashion, while one is doing extra work, is relatively awkward.

A mouse operated by a foot is known. The disadvantages of this known device is that it operates as a track-ball, namely a treadmill effect. A foot has to be run over the ball in a manner which is uncomfortable and awkward. A foot motion, which would be undesirable for operating a foot mouse, would be one where there is a treadmill motion. This involves a displacement of a foot by movement of the entire leg from the hip joint to the ankle joint. A disadvantage of such motion is that it utilizes numerous muscle groups and the cantilevered suspension of a large amount of body mass leading to muscle fatigue where there are extended periods of motion. Conversely, for the same reason, reaction time and resolution, namely motion accuracy, is likely to be relatively low.

There is, accordingly, a need to provide a mouse system for operating an electronic device such as a computer which is ergonomically and functionally more satisfactory than known systems.

SUMMARY

By this invention there is provided a system which reduces the disadvantages of the known pointing and steering devices.

According to the invention there is provided a pointing and/or steering device for use with a computer, and other electronic devices. When used with a computer the pointing device is conventionally known as a mouse.

In a preferred form of the invention the mouse for the computer is foot operated. Thus the invention includes means to effect pointing of a cursor on a computer screen and to effect clicking and dragging as is required in the common computer environments by use of foot interaction with the device.

In its preferred form, the foot interacts by rotating, swivelling and/or moving the foot about the ankle. This is opposed to having to use the foot to run in a treadmill fashion over a moving face, ball or plate in a treadmill manner.

The foot motion can be described as a relatively "wobbling" motion. This is achieved by the combination of motion about two joints. This is the displacement of a foot at the ankle joint (tibia-fibulo-talar joint) and the foot joint (midtarsal joint). This type of motion requires a relatively short reaction time and provides a higher resolution. Relatively fewer muscle groups are employed in this motion. The first axis of the ankle joint is perpendicular to the line of the tibia. The second axis is an axis expenting along a line from the heel to the great toe. Less body mass is displaced and consequently the actions are less fatiguing. This precessionary movement of the foot about these two axes, which are virtually perpendicular, is the physiological criterion for the foot interaction with the device of the invention.

The device includes an electronic circuit mounted on a board. The circuit includes operational circuitry and one or more switches responsive to pressure thereby to selectively open and/or close the electronic circuit.

A first control element for the device includes a face plate for application of physical pressure. The pressure is applied to the plate of the first control element by the bottom of a foot. It causes the first control element to interact with a transducer responsive element to operate the electronic circuit and thereby move an element, such as a cursor, on a computer.

The first control element and the transducer responsive element interengage whereby pressure applied to the pressure responsive element can effect a relative change of the responsive element on the computer. Thus applying pressure on a selected place and direction on the first control element acts to change the condition of the transducer responsive element.

The first control element includes a resilient material mounted such that pressure applied to the resilient material in different directions and positions acts to change the electrical relationship on the board and thereby vary an output signal from the electronic circuit.

The first control element preferably includes at least a partial ball and a partial interengaging socket. When there is movement applied to the transducer responsive element, there is simultaneous movement of the ball relative to the socket.

The resilient material is mounted with a solid substrate, and is located relatively inside the perimeter defined by the partial ball. There is a peripheral solid element for mounting the resilient material relatively to the partial ball. The transducer responsive element is operatively connected with the resilient material.

Movement of the resilient material is effected by interaction of the solid substrate with an activating skirt from the plate. This effects movement of the peripheral solid element and the transducer responsive element. There is also movement of the ball relative to the socket as the plate and interacting skirt moves the solid substrate. Collectively an effective movement of the transducer responsive element is achieved.

A resilient torus means is mounted in relation to the foot plate to bias the plate away from the transducer responsive element. Pressure is applied downwardly first by the foot to the plate and against the resilient torus means to cause the operation of the first control means, and movement of the transducer responsive element. Removal of foot pressure releases the plate from the transducer responsive element under the action of the resilient torus.

A second control element is also provided and the second control element is also responsive to foot pressure. As such pressure when applied to the second control element this causes the second control element to operate one of many switches. The second control element is movable with respect to a mounting such that foot action acts to cause the second control element to interact with the switches.

The second control element is physically located substantially adjacent to the first control element. In one preferred form of the invention, the control elements are located in the top face of a housing. In a further preferred aspect of the invention the housing member includes two ports. A first port is for locating the first control element, and a second port is for locating the second control element.

There is an output signal transmitted from the electronic circuit to a receiver for operating the computer cursor.

In some other preferred forms of the invention there is a third control element, the third control element being located in a spaced relationship from the second control element. The third control element is also selectively for operation by a foot. The third control element is movable relatively inwardly and outwardly in relation to an outer surface of the housing. There is a second switch for the electronic circuit, and this second switch is operable under interaction from the third control element thereby to generate switching signals in the electronic circuit.

The invention is further described with reference to the accompanying drawings.

DRAWINGS

The present invention, both as to its organization and manner of operation, together with further objects and advantages thereof, may best be understood with reference to the following description, taken in connection with the accompanying drawings in which.

DESCRIPTION

A pointing and/or steering device 10 in the form of a mouse to be operated by a foot 11 of an operator is provided for use with a computer 12 and other electronic devices.

When used with a computer 12 the pointing device 10 is a mouse. The mouse 10 for the computer 12 is foot operated, such that a foot 11 can effectively precess about two perpendicular axes, namely a first axis 13 or second axis 113. There is a first control element and second control element to effect pointing of a cursor 15 on a computer screen 16 and to effect clicking and dragging, as is required in the common computer environments, by use of foot interaction with the device.

The foot 11 interacts by rotating, swivelling, and or moving the foot 11 in a wobbling motion about the ankle 14 relative to a face plate 17. As such, the plate 17 is movable in an essentially rotational or revolutional fashion about a point 125 located on axis 18.

First Control Element and Transducer

A first control element 19 for the device 10 includes the face plate 17 for application of pressure. When pressure is applied to the plate 17 of the first control element 19 by a foot, the first control element is depressed downwardly as indicated by arrow 20. The face plate 17 can move as required about point 125 on axis 18. The plate 17 interacts with the transducer responsive element 21 to operate an electronic circuit and thereby move the cursor 15 of the computer 12.

The first control element 19 and the pressure responsive transducer element 21 interact whereby pressure applied to the pressure responsive element 21 can effect a relative electrical change of the electronic circuit on the board element 27.

The transducer 21 includes a grommet formed of a resilient material 22 mounted such that pressure applied to the resilient material 22 in different directions and positions acts to change the electrical relationship on the board mounting the electronic circuit. This acts to vary an output signal from the electronic circuit. In this manner applying pressure on a selected place and direction on the first control element 19 acts to change the condition of the transducer responsive element 21.

The grommet of resilient material 22 is formed of a silicone monomer and catalyst with various amounts of fiberglass added for stiffness. The silicone 15 is obtained from Douglas & Sturgess in San Francisco, Calif., and is part number SK2258A. The catalyst is SK2258B. The grommet of resilient material 22 can have acceleration characteristics altered at manufacture by varying the thickness of element 22 at the center adjacent to the axis 18 relative to the periphery where there is located a ring 25. The point 125 is located at the center of ring 25. The thinner the grommet material 22 at the center, the more the delay in the acceleration.

The first control element 19 also includes at least a partial ball construction 23 and a partial interengaging socket construction 24. When there is movement of the transducer responsive element 21, there is also movement of the ball 23 relative to the socket 24.

The pressure responsive transducer also includes a peripheral solid substrate element or ring 25 for mounting the resilient material 22. This ring 25 is located within the perimeter defined by the partial ball 23 and 24. The relationship is such that when there is effective movement of the peripheral solid element 25, which is part of the transducer responsive element, there is also movement of the transducer 21.

The transducer responsive element is connected with the resilient material 22. The transducer responsive element 22 includes a pointing stick 26 which is a stick-like structure whose physical appearance is such that the angular movement controls the movement of the cursor 15 on the display screen 16. This stick 26 operates with ancillary means including the electronic circuit such that angular movement is converted to the movement of the cursor 15.

A resilient torus or ring means 28 is mounted in relation to the plate 17 to act to bias the plate 17 away from the transducer responsive element 21. To operate the mouse, pressure is applied downwardly as indicated by arrow 20 first by the foot 11 and against the resilient means 28. This causes the operation of the first control element 19 on the transducer responsive element 21. Removal of foot pressure releases the plate 17 from the transducer 21 under the upward action of the resilient torus 28.

The resilient ring or torus 28 is surrounded by a further resilient member 29 to complete the construction supporting the face plate 17 upon a base 56. The resilient member can be a suitable foam or sponge material. The resilient material 22 is formed of a chemical composition with suitable rigidity to interact with the stick 26. The top of the stick 26 is inside a large stick 30 which engages a square hole in the underside 31 of the resilient material 22. As such, the resilient material has a broader diameter than the diameter 30, and is slotted relative to the substrate or ring 25 in a suitable manner such that an effective resilience can be achieved between the application of pressure from the face plate 17 to the transducer responsive element 21.

Depending from the underside 32 of the plate 17 is a ring formation 33 which has a skirt 34 the end of which engages the perimeter of the ring 25. The ring 33 is located inside the wall configuration 23 which is effectively formed by a curved wall 35 depending like a larger skirt from the underside 32 of the face plate 17. The wall 35 has a curved section 36 which engages the inside curve 37 of the socket 33. The wall 35 has a inwardly directed lip 38 which engages a mating lip 39 which extends from a wall 40 or arm 41 which is mounted adjacent the board element 27. The arms extend radially from the central axis 18 and are upwardly directed. The interengaging lips 38 and 39 act to hold the face plate 17 in a positive relationship with the transducer responsive element 21. The resilient members 28 and 29 force the face plate 17 upwardly so that the lips 38 and 39 interengage. It is under the foot pressure as directed by foot 11 downwardly according to arrow 20 that the lips disengage as the ball 23 moves down into the socket 24. The skirt 34 engages the periphery of the ring 25, and thereby can move the transducer responsive element as required. The resilient member material 22 interacts with the stick 26. This operation is similar to toggling a TrackPoint™ in a ThinkPad™ computer of International Business Machines Corporation.

Figure 1:
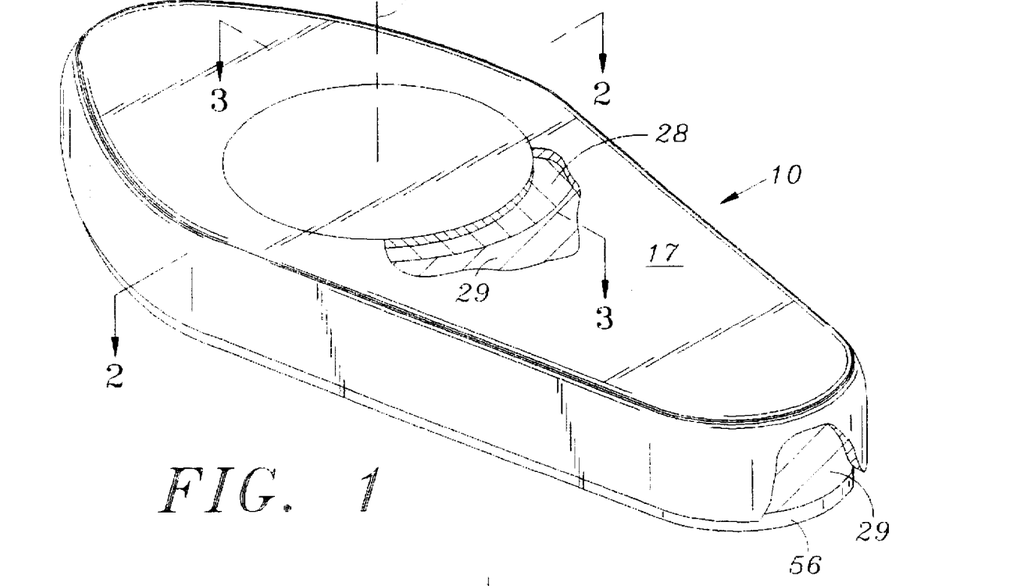
FIG. 1 is a top perspective view showing a foot mouse for use with a computer, part of a foot plate is broken away to show the underlying material below the foot plate and on top of a base.
Figure 2:
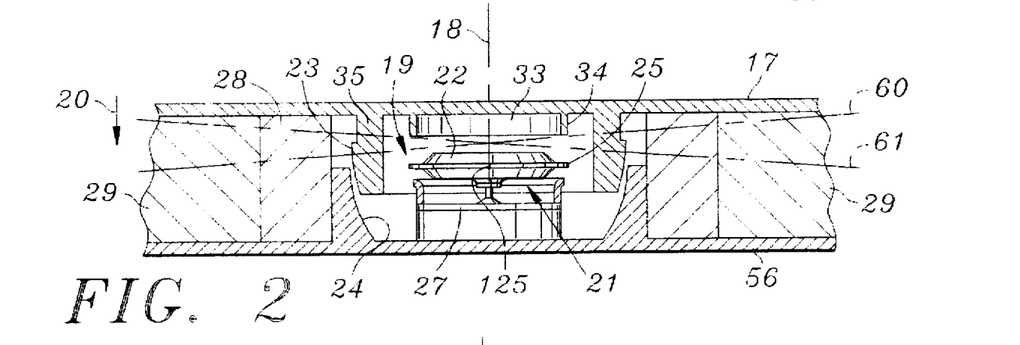
FIG. 2 is a sectional front view through line 2—2 of the foot mouse of FIG. 1 showing the components constituting the mouse, when the foot plate of the first control element is not in contact with the pressure transducer.

As illustrated in FIG. 2, there are shown by lines 60 and 61, a situation which would be akin to the position when the face plate 17 is forced downwardly so that the skirt 34 engages with periphery of ring 25. This rotational or revolutional movement takes place about point 125 on the axis 18, and the plate 17 can move leftwardly or rightwardly as indicated by lines 60 or 61.

Figure 3:
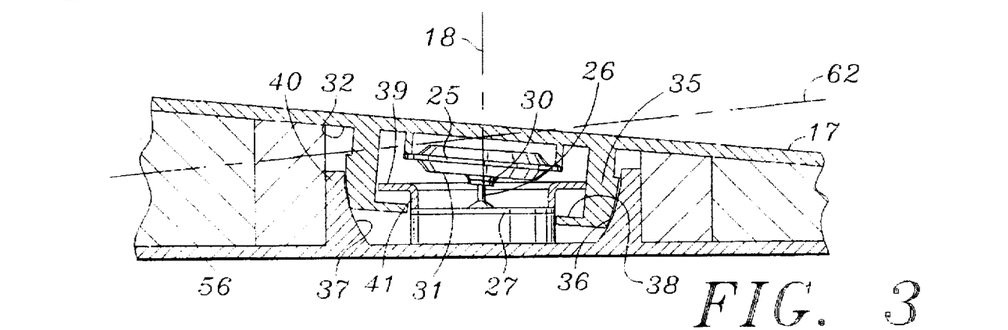
FIG. 3 is a sectional side view along line 3—3 of FIG. 1, with the foot plate in contact with the pressure transducer, and the foot plate tilted in a first direction.
Figure 4:
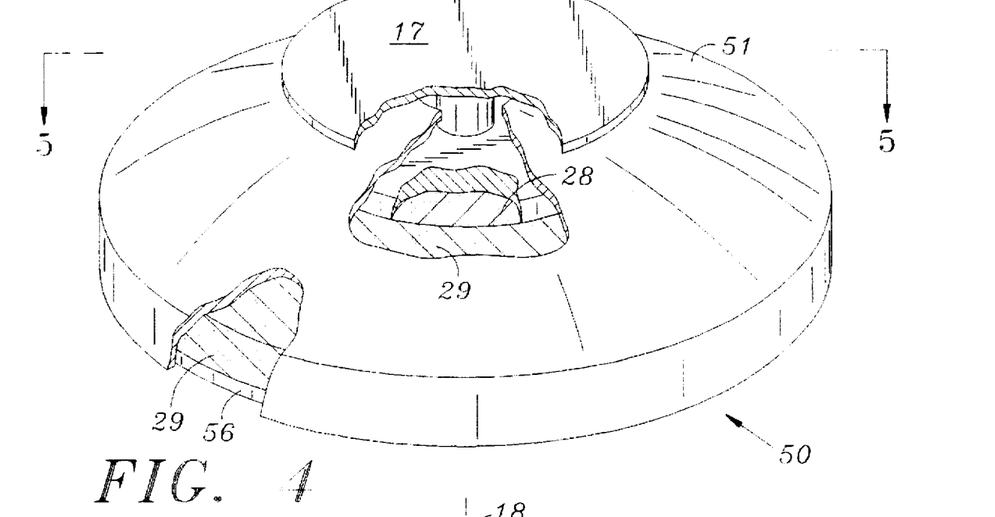
FIG. 4 is a perspective view with parts broken away of a different form of foot mouse showing a foot plate mounted upon a housing and the resilient material below the housing.
Figure 5:
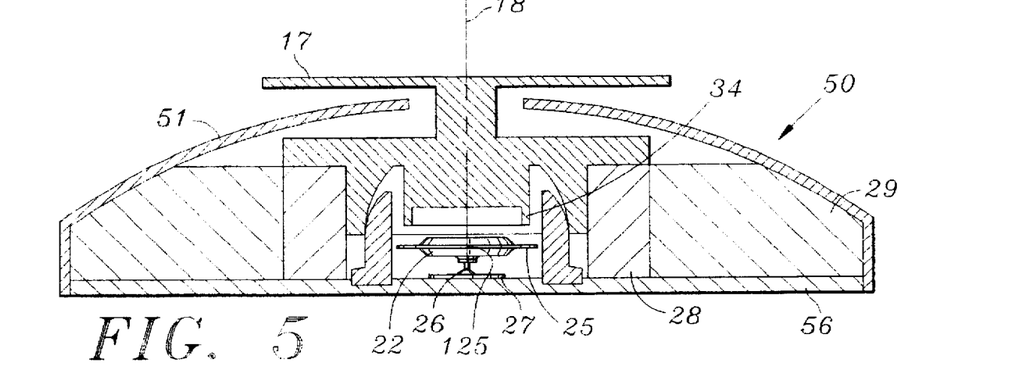
FIG. 5 is a sectional side view along line 5—5 of FIG. 4 showing the components of the foot mouse.
Figure 6:
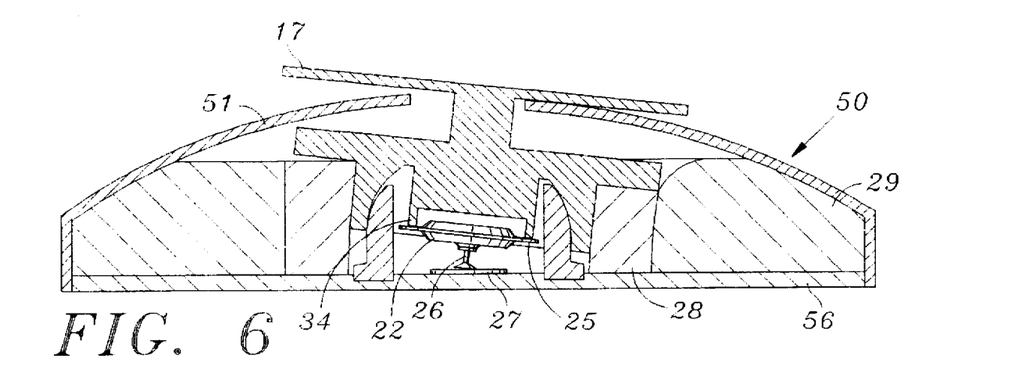
FIG. 6 is a sectional side view along the same lines of FIG. 5 with the foot plate tilted in a first direction.
Figures 7, 8, 9:
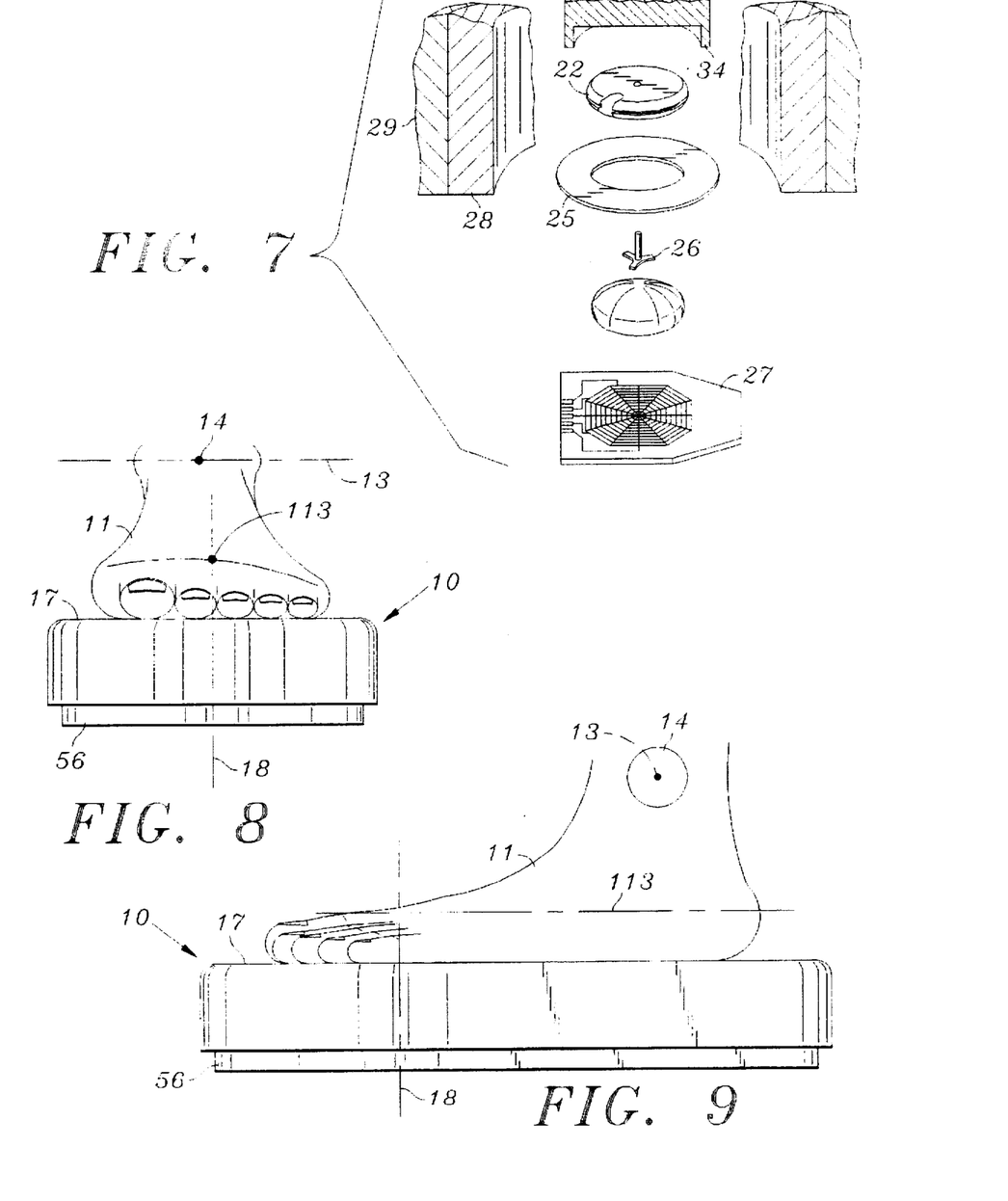
FIG. 7 is an exploded view of the components of the first control element, and the transducer responsive element in relation to an electronic circuit for the foot mouse.
FIG. 8 is a view from the front of a foot showing a foot operating a foot mouse and movement being effected in relation to the axis running through the ankle of a foot.
FIG. 9 is a diagrammatic view illustrating a foot on a foot mouse showing the location of an ankle relative to the foot mouse.

In FIG. 3, there is shown a situation where the plate 17 is already depressed and the movement is as indicated from front to back as indicated by the plate position 17. In FIG. 3, the position 62 shown in phantom of the plate 17 tilted in the opposite direction.

The ball 23 has an inwardly directed lip 38 which extends partially circumferentially around and inwardly directed from the wall 35. Lip 39 also does not extend completely circumferentially about the wall 40 or arm 41. In this manner, as illustrated in FIG. 2, the components appear not to have interengaging lips 38 and 39. However, when viewed in FIG. 3, the lips 38 and 39 interengage.

The manner of assembling the face plate 17 having the depending lip 38 together with lip 39 from wall 41 is a bayonet-type configuration assembly. The two components are assembled with a 90 degree offset center relative to axis 18 and then twisted and turned through 90 degrees in a bayonet fashion such as to achieve the engagement. The resilient foam 28 and 29 may need to be depressed to ensure that the lips 38 and 39 can interengage through a circumferential space. After engagement by the ring element along axis 18, the foam 28 can expand as the plate 17 moves up to its pre-operative position. The engagement is as illustrated so that the engaging lips 38 and 39 prevent the unintended separation of the component parts. As such, at least the lips 38 and 39 act as tangs to effect interengagement. There may be one or more dimples or steps provided to the lips 38 and 39 to hinder unintended separation.

The circumferential lips 38 and 39 extend circumferentially to a varying amount about the axis 18. Thus, in some cases, the lips 38 and 39 may extend as multiple sections for as much as 180 degrees about the circumference. In other situations, one of the lips, for instance lip 38, may extend substantially wholly about the circumference, and there are slots through which sections of the lip 39 pass and are then rotated into position as the various components are assembled.

As described, the pointing or steering device would operate a cursor 15 on a computer screen 16. The steering device for use with the computer can also include a second control element 70 and third control element 71, or any other number of control elements. The second and third control elements, respectively, would be for clicking, and dragging a cursor 15 on the computer screen 16 as required. The location of the second control element 70 and third control element 71 can be adjacent to the first control element and also be foot operated.

Housing

The pointing device 10 in some embodiments includes a housing 50 for location underneath the feet of an operator. The housing has a top face 51, a forward end 52, a rear end 53, opposed sides 54 and 55, and a bottom face 56. The top face 57 is a generally flat shape, the shape being substantially rectangular, although many other shapes are possible, with or without curvature. The face plate 17 is mounted in relation to the top face 51.

The housing 50 includes three ports 57, 58, and 59. The first port 57 is for housing the first control element 19, and a second port 58 is for housing the second control element 70, and the third port 59 is for housing a third control element 71.

The first control element 19, the second control element 70, and third control element 71 are located in a relatively adjacent position on the top face 51 of the housing 50. The first control element 19 is adapted for operation by the underneath of a right foot 11. The second control element and third control element are adapted for operation selectively by the underneath of a left foot. The left foot can be applied to the second or third control element 70 and 71 as required. In other situations the first control element 19 may be located on the left side for operation by the left foot and the second and third elements may be for operation by the right foot as necessary.

Electronic Circuit

The device 10 includes components for an electronic circuit 100 mounted on a board 27. The circuit components 100 include circuitry and for operation with one or more switches responsive to pressure from the first control element, second control element, and third control element selectively to open and close the electronic circuit 100. There is an output signal transmitted from the electronic circuit 100 to the computer 12 through an output device connected to hard wire 104.

The electronic circuit 100 is responsive to switches 101 and 102 and is responsive to pressure selectively to open and close the electronic circuit 100. The switch 101 reacts with second control element 70 and the switch 102 reacts with the third control element 71.

The electronic circuit 100 provides an output signal to device 126 for operating the computer 12. The output device 126 includes a hard-wired system 103 from the circuit 100. There are means for mounting the output device 126 to the board 27.

Pressure Transducer

One form of transducer, namely a pressure transducer, for the electronic circuit operable with the first control element 19 is described. The transducer operates as described with relation to FIG. 10. This is only one form of transducer that can be used to translate the action from the first control element 19 to an electric signal. There can be other forms of transducer device.

Figure 10:
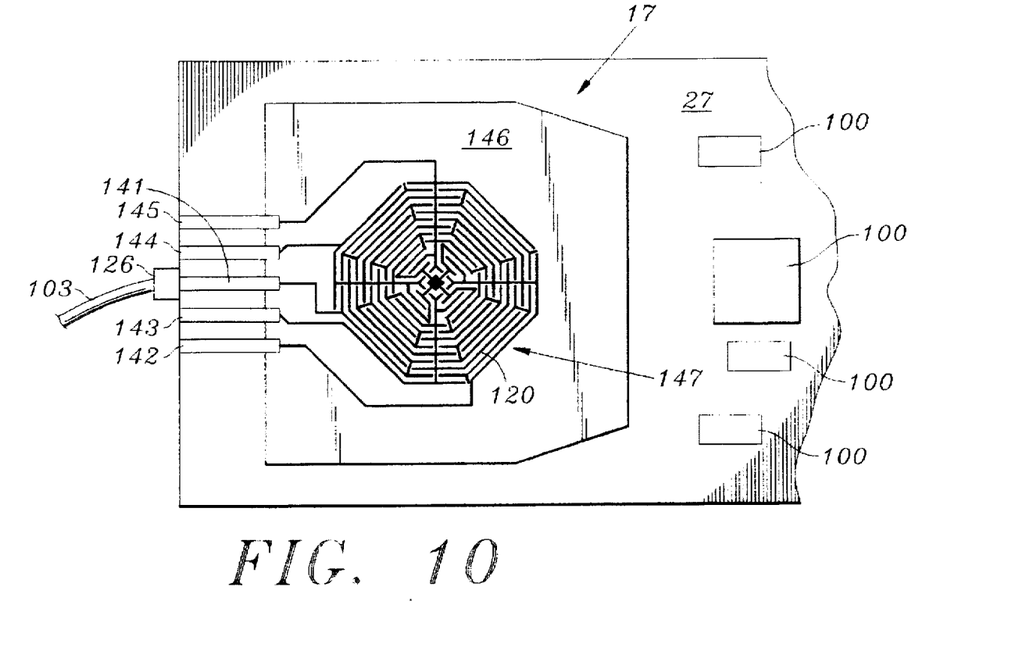
FIG. 10 is an alternative view of a transducer operating on pressure sensitivity in response from pressure from a foot mouse.
Figure 11:
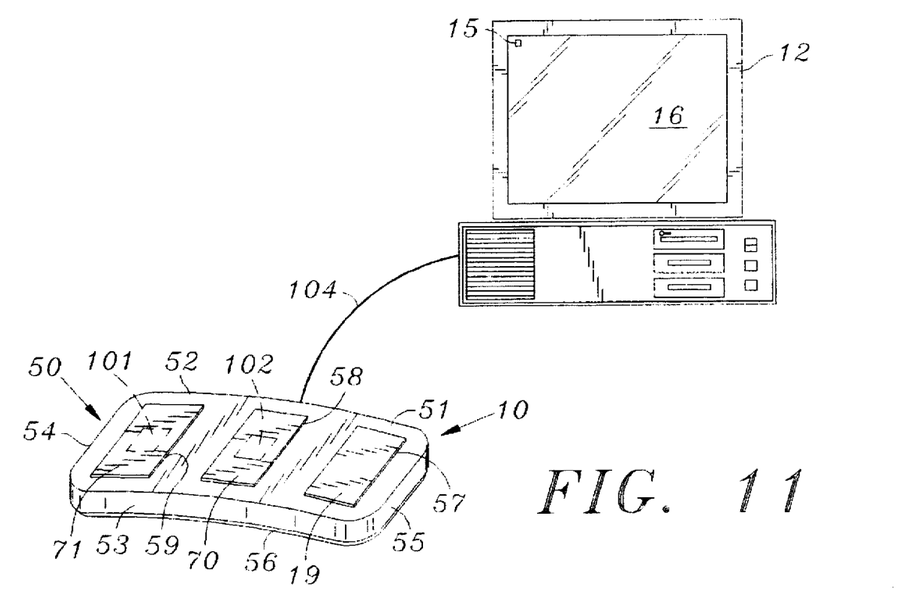
FIG. 11 is a view of a foot mouse having a first control element, second control element, and third control element connected to a computer.

There is an overlay conductive element arrangement 120 has five different terminals labeled 141–145 connected to output device 126. Underneath the overlay conductive elements 120 is a conductive plate 146, with a given resistance per unit square (e.g., 500 Ω/square mm).

The terminals 141–145 are respectively connected to different traces 147 on the conductive elements 120, all of which are conductive. The more of the conductive traces 147 that touch the conductive plate 146, the smaller the resistance. There is a larger current carrying area for the electrons.

Terminal 141 is the common trace. It has "fingers" that interleave with all of the other traces. Trace 141 completes the circuit for all other traces.

Trace 142 is the "Down" trace. Trace 143 is the "Left" trace. Trace 144, shown in white, is the "Up" trace. Trace 145 is the "Right" trace.

As a user presses down on a face plate, the pressure forces contact between the trace 141, and one or more of the other four traces 142 to 145, and the conductive plate 146.

For example, two scenarios are explained on how the pressure transducer works. The first example is that the user wants the cursor 15 on the computer screen 16 of computer 12 to move straight up or north on the screen 16, and the second example is that the user wants the cursor 15 to move in a southwesterly direction on the screen 16.

EXAMPLE 1

Straight Up (North)

For the user to move the cursor 15 straight north, the user would naturally tilt and press the foot 11 forward about the ankle 14. This motion would cause contact between trace 144, trace 141, and the conductive plate 146 underneath the overlay 120.

When the user wants to move the cursor 15 faster, the user would naturally tilt and press the foot 11 harder in the forward direction. This additional pressure causes additional contact between the longer fingers of traces 147 towards the outside of the hexagonal overlay 120, reducing the resistance and causing more current to flow. This will increase the speed of the cursor movement on the screen 16.

EXAMPLE 2

Southwesterly Direction

For the user to move the cursor 15 in a southwesterly direction, the user would naturally tilt the foot 11 backwards about ankle 14. The foot 11 twists about axis 113, while simultaneously tilting about axis 13. The tilt provides the north-south control. The twist provides east-west control. This motion would cause the trace 141 to contact the trace 143, which moves the cursor 15 to the left, and also cause the trace 144 to contact the trace 142. This moves the cursor 15 down. As with example 1, the harder the foot presses in that direction, the larger the contact area between the traces 147 and the conductive plate 146, making the cursor 15 move faster.

Any other movement is a similar motion to the above two examples.

The electronic circuit 100 operates as follows:

As the user applies pressure to one or more of the four quadrants underneath the ring 33, the conductive plate 146 for that quadrant becomes connected to the common portion of the plate 146. As more pressure is applied, the resistance decreases, since there is more current carrying area when more pressure is applied, therefore reducing the overall resistance. Since the voltage is constant, the current must increase to compensate for this change in resistance.

As the current changes, the resistors, capacitors, and driver for the output 126 change the intensity of the signal from the output 126. The circuit 100 can also perform the transformation from current into an increase in pulse repetition frequency (PRF), or from current into a different coding scheme to indicate a faster movement of the cursor 15.

Second Control Element

A second control element 70 is also mounted with the housing 50 and is responsive to foot pressure. Pressure is applied to the second control element 70 to cause the element to operate a switch 102. The second control element 70 is movable with respect to a mounting such that foot action acts to cause the second control element 70 to interact with the switch. The second control element 70 is located substantially adjacent to the first control element.

Both of the control elements are located in the top face 51 of a housing 50. The second control element 70 is located in a position of the housing 50 to act as a trigger movable under pressure at least partly towards the rear end 53. This movement acts to operate the switch for the electronic circuit 100. The switch is a mechanical element for the circuit 100.

The mounting is provided for the second control element 70, such that as a foot engages with the second control element, that foot action acts to cause the control element to move about the mounting and thereby interact with the switch.

Third Control Element

There is a third control element 71 located in a spaced location from the second control element 70. The third control element 71 is also selectively operational by a foot 11. The third control element 71 is movable relatively inwardly and outwardly about a mounting in relation to the outer top face 51 of the housing 50.

There is a second switch 102 for the electronic circuit 100. This second switch is operable under interaction from the third control element 70 thereby to generate switching signals in the electronic circuit 100.

General

Many other forms of the invention exist, each differing from others in matters of detail only.

There can be multiple control elements located on the housing. The multiple control elements are responsive to pressure to operate switch elements related with each respective control element thereby to control the operation of the electronic circuit.

Although the invention is described generally in relation to the application of foot pressure on the control elements, clearly the system can operate under pressure from the hand. This may be a finger, or the palm of the hand. In different situations, one or more hands or feet may operate the control elements of the pointing device. The hand may move under angular motion about a wrist of a user. This again differs from all previous hand operated mice which all use a sweeping motion of the hand and arm rather than wobbling about the wrist.

Further, instead of operating or steering an element on a computer, the device may be used to point or steer other electronic responsive devices. These could be tools or equipment for medical or dental needs or other industrial purposes, as well as steering large mechanical devices such as airplanes and helicopters.

In some cases the resilient element may be sufficiently firm that there is no use for a metal ring, the substitute may leave a different shape. In other cases, instead of the ring substrate, the substrate may have a different shape. In yet further cases, the resilient element is dispensed with and the foot plate engages directly with the pressure transducer element.

Figure 12:
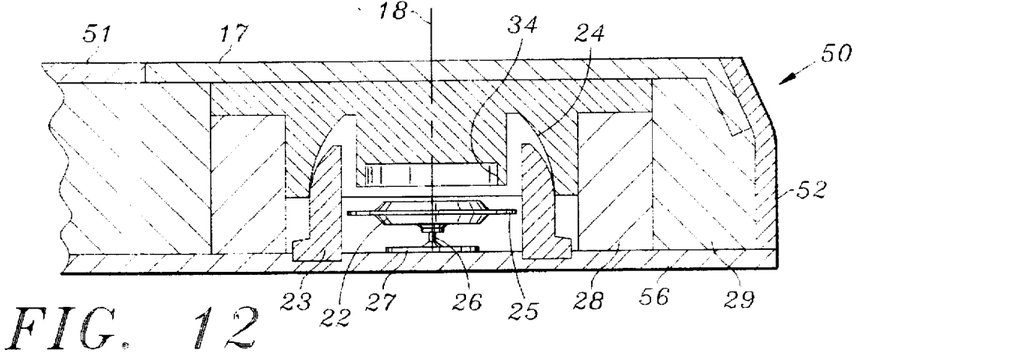
FIG. 12 is a cross-sectional view of a different embodiment of a foot mouse showing a face plate anchored below a wall upstanding from a base of the device.

In FIG. 12, an embodiment is shown wherein the face plate 17 is built to be relatively flush with a top face 51 of the housing 50. The socket 24 depends downwardly from the face plate 17 and the ring 33 is located within the socket 24. A wall configuration 23 is located inside of the socket and between the socket and the ring 33. The resilient material 22 is located on the ring 25 which is connected with the stick 26 mounted on the board 27. The resilient ring torus 28 is located around and about the socket member 24 and a resilient material 29 of the same or different resilience is located to complete the space between the face plate 17 and 52, and base 56.

Figure 13:
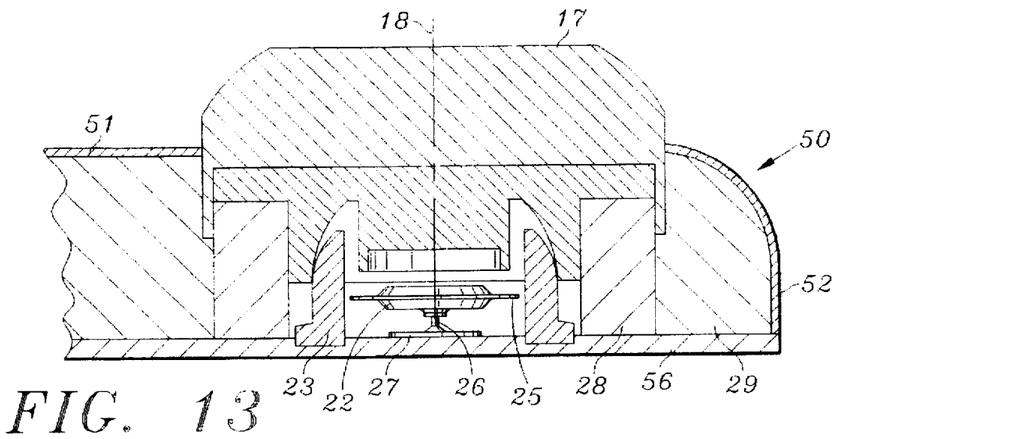
FIG. 13 is a cross-sectional view of a further embodiment of a device showing a button-type mechanism exiting from a port over the top face of a housing for the mouse.

In FIG. 13, there is a variation of the configuration shown in FIG. 12. In this case, the face plate 17 protrudes as an element from the top face 51.

Figure 14:
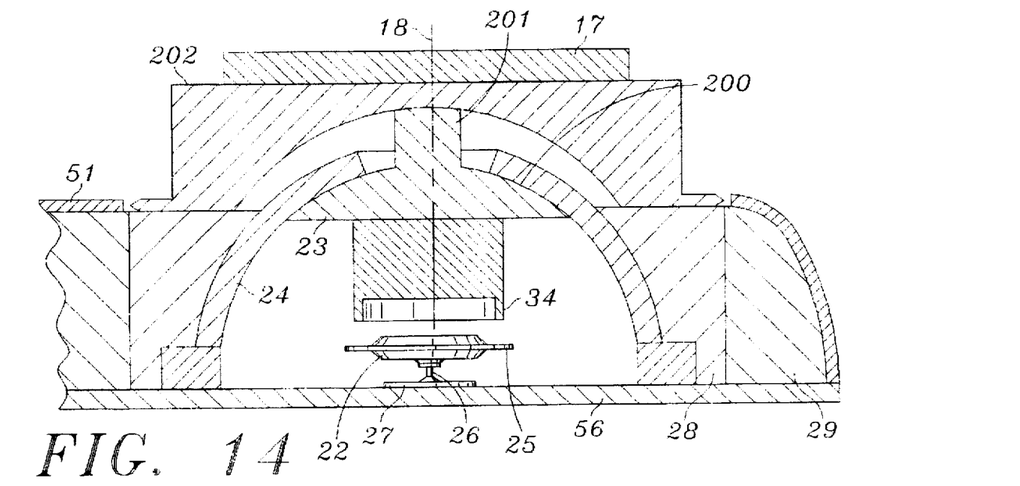
FIG. 14 is a cross-sectional view of a further embodiment of the device showing a ball and socket, the ball mechanism having a protruding rod for engaging the foot plate, and the engaging skirt for activating the transducer responsive member depending from the ball.

In FIG. 14, the configuration is yet again different, and the situation is that there is a socket configuration 24 passing within it a ball 23. The socket configuration depends downwardly and opens outwardly towards the base 56. The ball configuration 23 is oppositely directed to the ball in the prior embodiments and is downwardly depending such that the interface 200 between the socket 24 and ball 23 is at a top portion of the socket 24. The ball has a protruding rod 201, which engages a foundation member 202 on which the face plate 17 is mounted.

Figure 15:
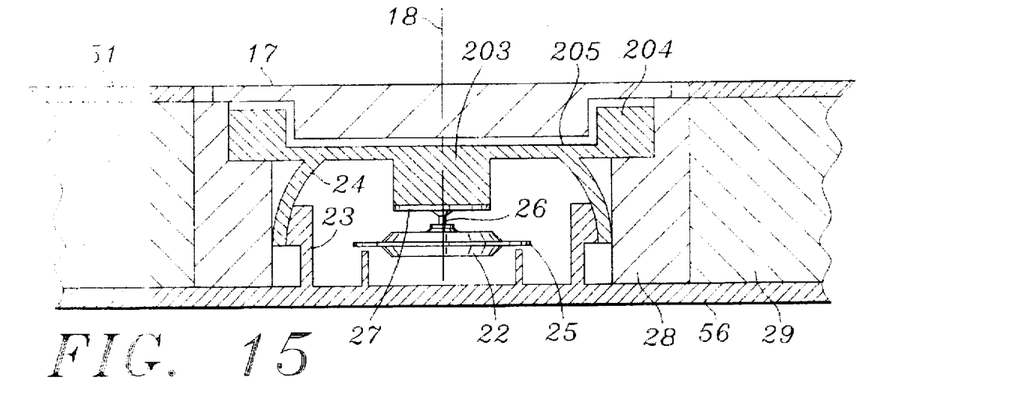
FIG. 15 is a cross-sectional view of a different configuration of the device, and wherein the pointing stick associated with the resilient member is connected in a reverse position, namely, pointing upwardly from the resilient member.

In yet a further configuration as illustrated in FIG. 15, there is a socket 24 and ball 23 arrangement illustrated. The configuration of the resilient member on the ring 25 also has a pointing stick 26 directed upwardly to mount on a depending leg 203 from a foundation 204 which mounts the socket 24. The movement of the socket 24 relative to the ball 23 causes the stick 26 to move relatively with resilient member 22. The circuit board 27 is mounted at the base of the protrusion 203. The resilient members 28 and 29 act to bias the socket 24 from engagement with the ball 23.

Figure 16:
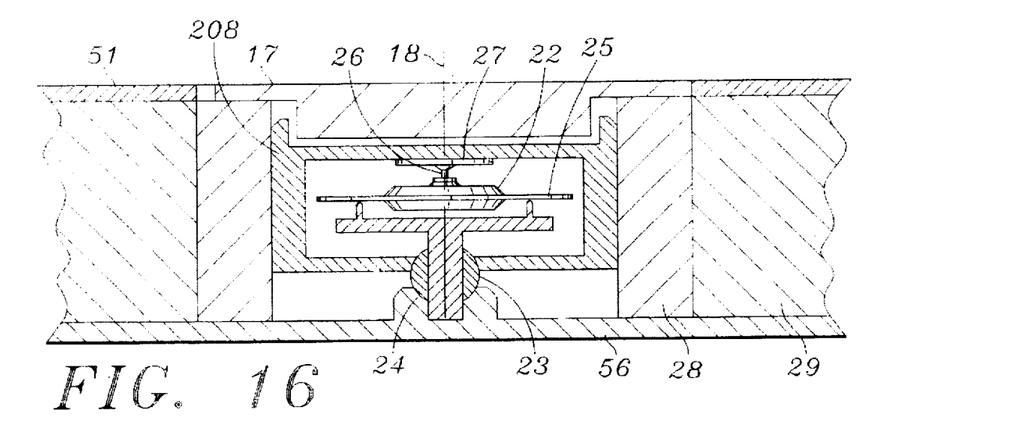
FIG. 16 is a further cross-sectional view of a different embodiment of the device wherein there is a ball and socket member located adjacent to a base of the housing, and wherein the pointing stick associated with the resilient member is connected in a reverse position, namely, pointing upwardly from the resilient member.

In FIG. 16, the embodiment is one where the ball 23 is mounted in a socket 24 which itself is mounted on the base or bottom 56 of the housing. There is now a side resilient member 28 and a member 29 which act to urge the face plate 17 upwardly and away from engagement with a foundation 208 which mounts the circuit board 27 to which there is a activating stick 26 connected with the resilient member and the ring 25. The action of the system is that the plate 17 is pushed downwardly by the foot against the effect of the resilient member 28 and this causes the interaction of the first control member on the transducer mechanism 26 cooperating with elements 22 and 25. The plate 17 can be tilted appropriately, and the tilting action is governed by revolution of the foundation 208 about the ball 23.

Figure 17:
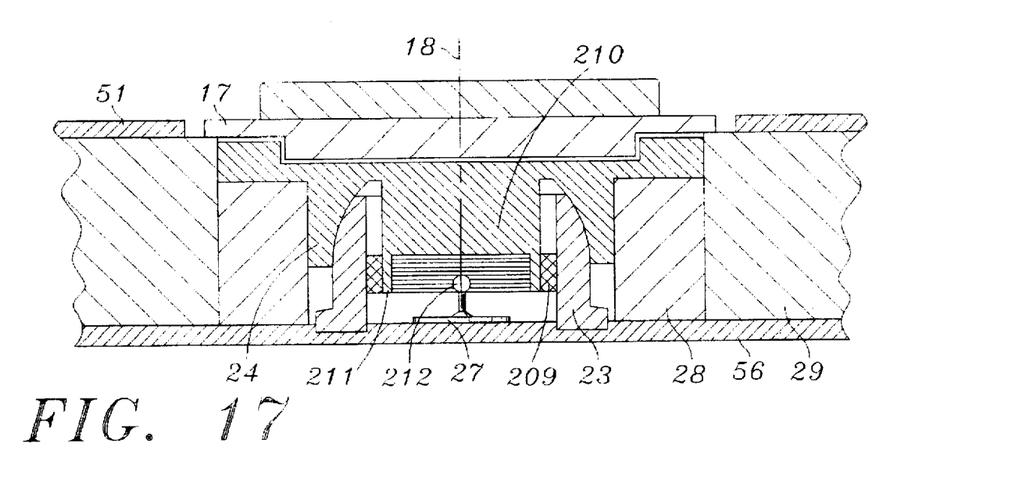
FIG. 17 is a cross-sectional view of a further device using an opto-electric transducer system.

FIG. 17 shows yet a different variation of the system wherein instead the transducer responding to pressure movement to activate the circuit 100 on board 27 there is electro optical system 209 built into the inside perimeter of a ball configuration 23. The ball 23 cooperates with the socket 24. As a stud 210 is pushed downwardly, the legs 211 act to interfere with the optical system 209 which is directed to cooperate with a optically transmissive member 212. In this manner, as there is interference progressively with the signals which would pass from transmission member 212 to optical system 209 either on a horizontal basis or a radial basis, different signals are passed to the electronic circuit on board 27 and thereby different signals pass from the device as required.

Figure 18:
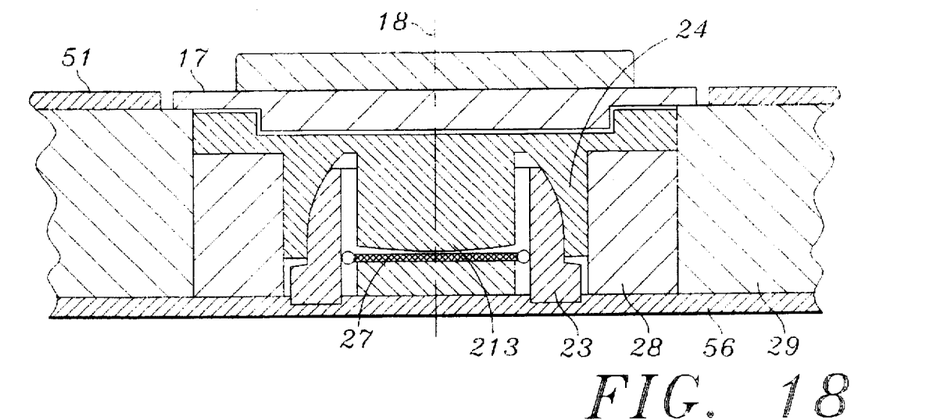
FIG. 18 is a cross-sectional view of the device using, for example, a pressure transducer array or capacitive array.

FIG. 18 is a further embodiment using a pressure transducer. There is an interface material 27 which engages with a convex ellipsoidal surface which is mounted to the overlay device and array 146. As the socket member 24 is pushed downwardly and moves in relation to the ball 23 so that the plate 17 revolves about the ball 23 as required pressure is applied to the interface material 27 in a manner fully described.

In FIGS. 14 through 18 there is a space, namely a moat, between the periphery of the plate 17 and the adjacent housing components. This is to permit effective movement of the plate 17.

Figure 19:
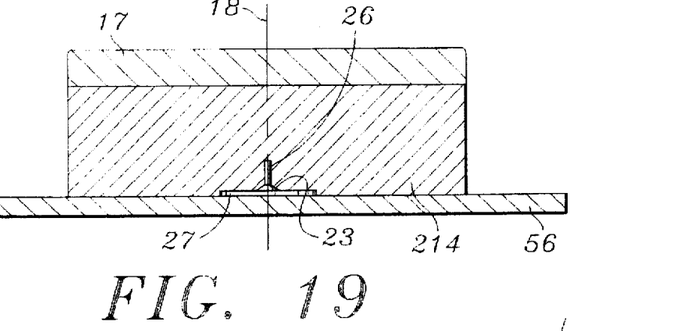
FIG. 19 is a cross-sectional view of a further device wherein the resilient member is associated with the pressure transducer without a ball and socket intermediate construction.

In FIG. 19, there is diagrammatically shown an operative system working with a face plate 17. There is a resilient member 214 mounted between the face plate 17 and a separate board 27. Revolution of the plate about the center of the ball 23 effects movement of the stick 26 relative to the board 27 to operate an electronic circuit and thereby move the cursor 15 of the computer 12.

Figure 20:
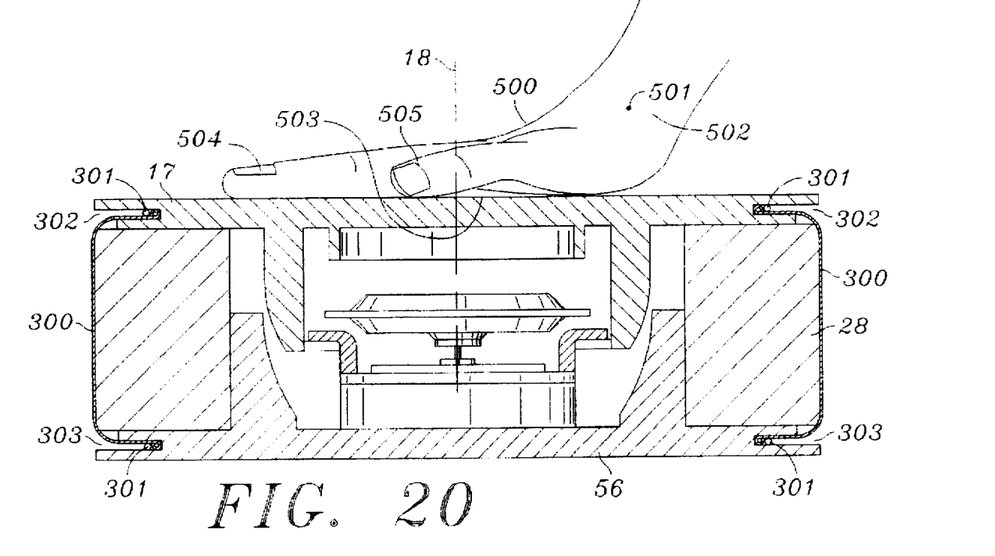
FIG. 20 is a cross-sectional view of a further device wherein the device is locked together with an elastic garter.

In the embodiment illustrated in FIG. 20, the first control member is connected with the bottom face 56 with the various components between them. There is provided an elastic or resilient garter 300, conveniently made of Spandex™, which embraces the periphery of the components. The garter is a tube type member. One or more elastic webs or band formations 301 are provided to fit within a slot 302 and slot 303 to secure the web material 301 in position and thereby hold the resilient material 300 in position. This effectively locks the various components together to form an integrated device.

As shown in FIG. 20, there is a hand 500 which is located on the face plate 17. The hand moves about an axis 501 in the wrist portion 502 of the hand. The palm 502 of the hand engages the face of the plate, and the fingers 504 and 505 extend in a flush manner over the top of the plate in a manner permitting operation of the face plate 17. The face plate 17 in this manner is tilted forwards and backwards or sideways by movement of the hand 500 about the axis 501 defining the wrist. This is a swivel-like motion about the axis 501.

Figures 21, 22, 23:
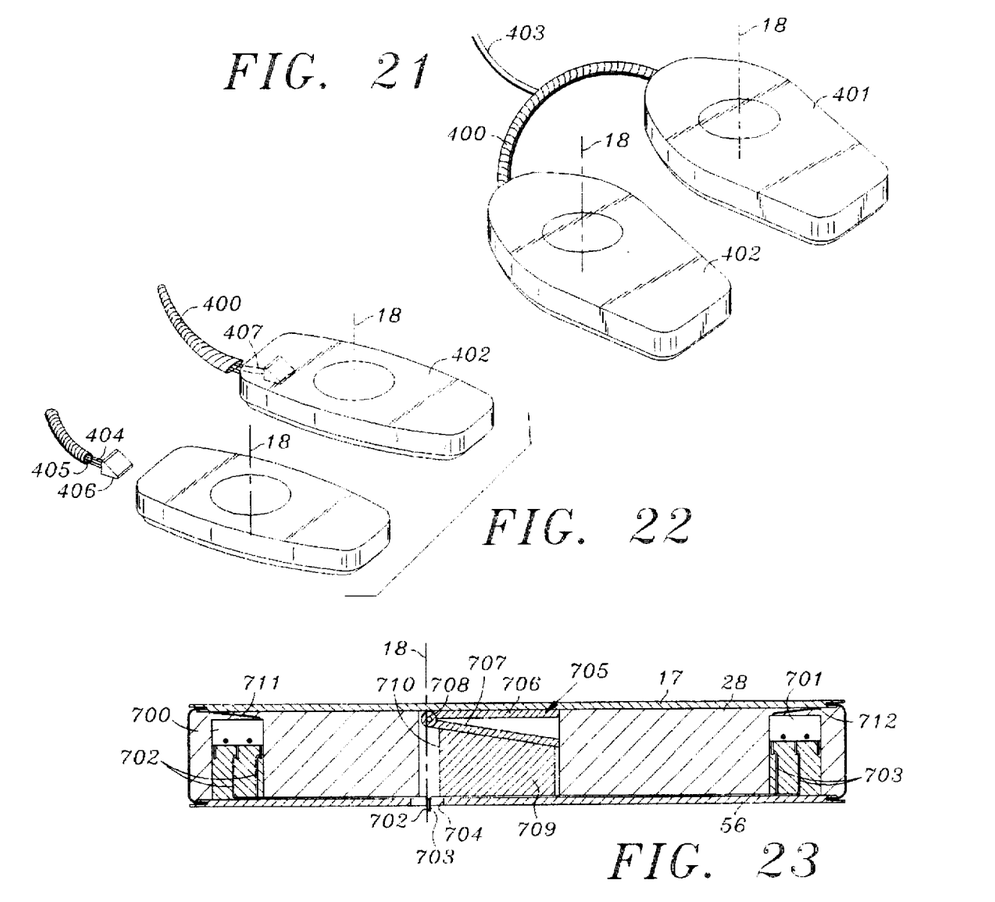
FIG. 21 is a diagrammatic view of two control elements for the steering device.
FIG. 22 is a different view of a first control element of a steering device with a cable connected to the base.
FIG. 23 is a side view of a clicker control element.

As illustrated in FIGS. 21 and 22, there is a linkage between the cursor pedal and a clicker pedal which is part of the steering device having a first control element and a second control element. These elements include a cable with spring memory 400 which would be between a first control element 401 and a second control element 402. There is a wire 403 for hard wiring to a computer. The first control element can be a cursor control and the second control member 402 can be a click control. The click control is effectively a mouse with two buttons and a rocker switch with toe and heel for controlling the respective click switches of the second control 402.

The cable with the spring memory is further illustrated in FIG. 22. The cable with the spring memory 400 has within it a wiring 404 which runs inside of the bore. The cable cover has an end 405 which connects with a housing 406 at the one end of the clicker control member 402. The housing allows the cable 400 to connect to the base, and the housing 406 is mounted to the base. On assembly, the cable cover 400 is pulled over the housing 406. Also, as shown, there is an anchoring means 407 for the cable 400 in the front of the housing 406 when assembled.

As such, the cursor 401 and clicker 402 are connected by cable with a spring memory 400 within which the wires 404 are located. The cable 400 effectively can be a number of "pop beads" or a snake similar to an Eveready Snakelite™, and this allows for the connection to bend to any desirable shape and hold that shape as necessary. The foot pedals 401 and 402 are linked and their position is locked relative to each other. In this manner, the feet of the user can be comfortably orientated relative to the two control element 401 and 402. The housing 406 tapers inwardly so that toes of a user sticking over the front of a foot plate would not interact with the cable 400. The housing 406 and 405 is located relative to the foot plate in a manner which avoids touching the foot plate.

In FIG. 23, there is shown a clicker control element which has in the front portion a first clicker 700 which acts as a mechanical switch when the plate 17 is pushed forwardly. There is a second mechanical switch 701 at the rear of the control element. Wire 702 from the first switch 700 and wire 703 from the second switch 701 are directed to the central portion and a outlet port 704 in the base 56 of the control element.

There is also a mechanical hinged element 705 with a limb 706 and limb 707 hinged at 708. This is mounted on a rigid base 709 with a vertical front face 710. When the plate 17 is pushed forwardly, the hinge 705 opens to permit the plate to engage the top limb 711 of the switch 700. Similarly, when the plate 17 is pushed rearwardly, the hinge 705 closes and the limb 712 is urged downwardly to engage the switch 701.

Figure 24:
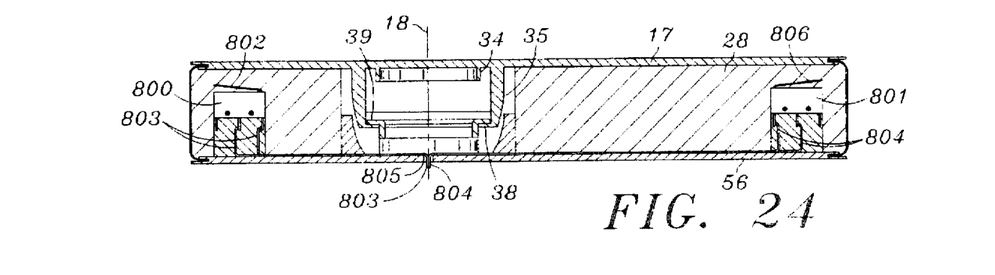
FIG. 24 is a side view of another clicker control element.

In FIG. 24, the embodiment shows a switch 800 in the front and 801 in the rear. There is a limb 802 on the top face of switch 800 and a limb 806 on the top face of switch 801. Wires 803 and 804 are directed to exit the port 805 which is in the base 56. In the central portion, the plate has a skirt 34 together with the walls and the interengaging lips 38 and 39. In this embodiment there is no transducer in the central portion. Both the control elements shown in FIGS. 23 and 24 are for performing the click operations of a mouse device. There can be multiple switches in the devices of FIGS. 23 and 24, the switches being located in adjacent relationship to each other.

Furthermore, different kinds of transducers can be used, for instance, optical transducers.

The invention is to be determined solely in terms of the following claims.

What is claimed is:

1. A foot operated steering device for use with an element to be moved comprising:
   (a) an electronic circuit mounted on a board, the circuit including a transducer responsive element on the board mounting the electronic circuit;
   (b) a first control element having a face for application of foot pressure such that foot pressure applied to the face of the first control element causes the first control element to interact with the transducer responsive element to operate the electronic circuit and thereby move an element;
   (c) the first control element being normally spaced from the transducer responsive element and wherein a predetermined amount of downward movement of the face is necessary to cause interaction with the transducer responsive element and when the first control element and the transducer responsive element interengage under foot pressure applied to the face a relative change of the transducer is affected such that foot pressure applied on a selected place and direction on the first control element acts to change the condition of the transducer responsive element; and
   (d) the operation being effected by movement of a foot relative to an ankle, the movement being relatively swivel-like about the ankle.

2. A steering device for use with an element to be moved comprising:
   (a) an electronic circuit mounted on a board, the circuit including a transducer responsive element on the board mounting the electronic circuit;
   (b) a first control element having a face for application of pressure such that pressure applied to the face of the first control element causes the first control element to interact with the transducer responsive element to operate the electronic circuit and thereby move an element; and
   (c) the first control element being normally spaced from the transducer responsive element and wherein a predetermined amount of downward pressure on the face is necessary to cause the interaction with the transducer responsive element, and when the first control element including a pressure responsive element interengage at least partly over a peripheral interface of the transducer responsive element a pressure applied to the peripheral interface can effect a relative change of position of the transducer responsive element about a central position of the transducer responsive element.

3. A steering device as claimed in claim 1, including at least a second control element, the second control element being responsive to foot pressure such that pressure on the second control element acts to operate a switch for the electronic circuit.

4. A steering device as claimed in claim 3, wherein the second control element is located to act as a trigger movable under foot pressure to operate a switch for the electronic circuit, and the switch being a mechanical element for the circuit.

5. A steering device as claimed in claim 1, including a peripheral interface for the first control element and the transducer, the first control element being movable with the transducer responsive element, and the first control element including a face for foot engagement, the face having a mounting for rotation relative to the transducer responsive element such that foot movement acts to cause the first control element to move spherically about the mounting and thereby permit a controlled revolutional movement of the first control element.

6. A steering device as claimed in claim 1, wherein the first control element includes a resilient material such that pressure applied to the resilient material in different directions and positions acts as part of the transducer responsive element to change the electrical relationship of the electronic circuit of the board and thereby vary an output signal from the electronic circuit.

7. A steering device as claimed in claim 3, including a housing member, the housing member including two ports, a first port for housing the first control element, and a second port for housing the second control element.

8. A steering device as claimed in claim 7, wherein both the first control element and the second control element are located in a top face of a housing, and wherein the first control element is adapted for operation by a first foot, and the second control element is adapted for operation by a second foot.

9. A steering device as claimed in claim 2, including a second control element, and wherein both the first control element and the second control element are located relative to a face of a housing, and wherein the first control element is adapted for operation by a hand, and the second control element is adapted for operation by a hand.

10. A steering device as claimed in claim 2, wherein the first control element is adapted for operation by hand pressure, the hand moving angularly about a wrist.

11. A steering device as claimed in claim 2, wherein the first control element is adapted for operation by foot pressure, the foot moving under a wobbling motion such motion being motion about an ankle joint and about a foot joint.

12. A steering device as claimed in claim 1, wherein the electronic circuit provides an output signal, and including means for transmitting the output signal for operating a computer.

13. A steering device as claimed in claim 3, including a third control element, the third control element being located in a spaced location from the second control element, the third control element being for selective operation by a foot, the third control element being movable relatively inwardly and outwardly relative to a housing, and including a second switch for the electronic circuit, the second switch being operable under interaction from the third control element thereby to generate switching signals to the electronic circuit.

14. A steering device as claimed in claim 1, including multiple control elements located on a housing, the multiple control elements being responsive to pressure to operate switch elements related with each respective control element thereby to control the operation of the electronic circuit.

15. A steering device as claimed in claim 1, wherein the first control element includes at least a partial ball and a partial interengaging socket, the movement of the ball relative to the socket being effected with movement of the transducer responsive element.

16. A steering device as claimed in claim 2, wherein the first control element includes at least a partial ball and a partial interengaging socket, the movement of the ball relative to the socket being effected with movement of the transducer responsive element.

17. A steering device as claimed in claim 15, wherein the first control element includes a resilient material mounted relatively to the partial ball such that movement on the ball permits movement of the transducer responsive element.

18. A steering device as claimed in claim 16, wherein the first control element includes a resilient material mounted relatively to the partial ball such that movement on the ball permits movement of the transducer responsive element.

19. A steering device as claimed in claim 17, wherein the first control element includes a peripheral solid element for mounting the resilient material mounted relatively to the partial ball, the transducer responsive element including the resilient material.

20. A steering device as claimed in claim 18, wherein the first control element includes a peripheral solid element for mounting the resilient material mounted relatively to the partial ball, the transducer responsive element including the resilient material.

21. A steering device as claimed in claim 2, including locking means for securing the first control element, electronic circuit and transducer, the locking means including a resilient garter.

22. A pointing device for use with a cursor element to be moved on a computer comprising:
(a) an electronic circuit mounted on a board within a housing, the circuit including a transducer responsive element on the board mounting the electronic circuit;
(b) a first control element having a face for application of pressure such that pressure applied to the face of the first control element causes the first control element to interact with the transducer responsive element to operate the electronic circuit and thereby move a cursor element;
(c) the first control element and the pressure responsive element normally be disengaged, and whereby a predetermined downward pressure on the control element affects interengagement whereby pressure applied to the pressure responsive element can affect a relative change of the responsive element such that pressure on a selected place and direction on the first control element acts to change the condition of the transducer responsive element;
(d) the electronic circuit including means for providing an output signal in response to the condition of the transducer responsive element, and including means for transmitting the output signal to a computer to move the cursor selectively over 360° on a screen associated with the computer; and
(e) a resilient material located with the transducer responsive element for urging the first control element away from engagement with the transducer.

23. A pointing device as claimed in claim 22, wherein the first control element includes at least a partial ball and a partial interengaging socket, the movement of the ball relative to the socket being effected with movement of the transducer responsive element.

24. A pointing device as claimed in claim 22, wherein the first control element includes a resilient material mounted relatively to the partial ball such that movement on the ball being effected with movement of the transducer responsive element.

25. A pointing device as claimed in claim 23, wherein the first control element includes a peripheral solid element for mounting the resilient material mounted relatively inside the partial ball, the transducer responsive element being connected with the resilient material.

26. A pointing device as claimed in claim 22, including at least a second control element, the second control element being responsive to pressure such that pressure on the second control element acts to operate a switch for the electronic circuit.

27. A pointing device as claimed in claim 26, wherein both the first control element and the second control element are located in a top face of a housing, and wherein the first control element is adapted for operation by a first foot, and the second control element is adapted for operation by a second foot.

28. A pointing device as claimed in claim 22, including a peripheral interface for the first control element, the first control element being movable with the transducer responsive element, and the first control element including a face for engagement by a human foot, the face having a mounting for permitting rotation relative to the responsive element such that foot movement acts to cause the first control element to swivel about the mounting and thereby permit movement of the first control element.

29. A pointing device as claimed in claim 26, including a third control element, the third control element being located in a spaced location from the second control element, the third control element being for selective operation by a foot, the third control element being movable relatively inwardly and outwardly, and including a second switch for the electronic circuit, the second switch being operable under interaction from the third control element thereby to generate switching signals to the electronic circuit.

30. A steering device as claimed in claim 22, including locking means for securing the first control element, electronic circuit and transducer, the locking means including a resilient garter.

31. A foot operated steering device for use with an element to be moved comprising:
(a) an electronic circuit mounted on a board, the circuit including a transducer responsive element on the board mounting the electronic circuit;
(b) a first control element having a face for application of downward foot pressure such that downward foot pressure applied to the face of the first control element causes the first control element to interact with the transducer responsive element to operate the electronic circuit and thereby move an element selectively over 360°;
(c) the first control element and the transducer responsive element interengaging whereby foot pressure applied to the face can affect a relative change of the transducer such that foot pressure applied on a selected place and direction on the first control element acts to change the condition of the transducer responsive element; and
(d) the operation being effected by movement of a foot relative to an ankle, the movement being relatively wobbling about the ankle, such motion being a displacement of the foot at the ankle joint and the foot joint.

32. A foot operated steering device for use with an element to be moved comprising:
(a) an electronic circuit mounted on a board, the circuit including a transducer responsive element on the board mounting the electronic circuit;
(b) a first control element having a face for application of downward foot pressure such that downward foot pressure applied to the face of the first control element causes the first control element to interact with the transducer responsive element to operate the electronic circuit and thereby move an element selectively over 360°;
(c) the first control element and the transducer responsive element interengaging whereby foot pressure applied to the face can affect a relative change of the transducer such that foot pressure applied on a selected place and direction on the first control element acts to change the condition of the transducer responsive element and wherein an increase in pressure on the control element creates an increase in the speed of movement of the element; and (d) the operation being effected by movement of a foot relative to an ankle, the movement being relatively swivel-like about the ankle.

33. A pointing device for use with a cursor element to be moved on a computer comprising:

(a) an electronic circuit mounted on a board within a housing, the circuit including a transducer responsive element on the board mounting the electronic circuit;

(b) a first control element having a face for application of downward pressure such that downward pressure applied to the face of the first control element causes the first control element to interact with the transducer responsive element to operate the electronic circuit and thereby move a cursor;

(c) the first control element and the pressure responsive element interengaging whereby pressure applied to the pressure responsive element can affect a relative change of the responsive element such that pressure on a selected place and direction on the first control element acts to change the condition of the transducer responsive element;

(d) the electronic circuit including means for providing an output signal in response to the condition of the transducer responsive element, and including means for transmitting the output signal to a computer to move the cursor selectively over 360° on a screen associated with the computer; and (e) a resilient material located with the transducer responsive element for urging the first control element away from engagement with the transducer, and wherein a smooth increase in pressure on the control element creates a substantially smooth increase in speed of the cursor.

34. A pointing device for use with a cursor to be moved on a computer comprising:

(a) an electronic circuit mounted on a board within a housing, the circuit including a transducer responsive element on the board mounting the electronic circuit;

(b) a first control element having a face for application of downward pressure such that downward pressure applied to the face of the first control element causes the first control element to interact with the transducer responsive element to operate the electronic circuit and thereby move a cursor;

(c) the first control element and the pressure responsive element interengaging whereby pressure applied to the pressure responsive element can affect a relative change of the responsive element such that pressure on a selected place and direction on the first control element acts to change the condition of the transducer responsive element;

(d) the electronic circuit including means for providing an output signal in response to the condition of the transducer responsive element, and including means for transmitting the output signal to a computer to move the cursor selectively over 360° on a screen associated with the computer, and the first control element not being for switching the electronic circuit; and (e) at least a second control element, the second control element being responsive to pressure such that pressure on the second control element acts to operate a switch for the electronic circuit, the second control element not being for moving the cursor, the second control element being in a unit separate from the first control element and being intended to be operated by a human limb different to a human limb for operating the first control element.

* * * * *